United States Patent [19]

Marshall et al.

[11] Patent Number: 4,761,545

[45] Date of Patent: Aug. 2, 1988

[54] TAILORED EXCITATION FOR TRAPPED ION MASS SPECTROMETRY

[75] Inventors: Alan G. Marshall; Tom L. Ricca, both of Columbus, Ohio; Tao-Chin L. Wang, Rockville, Md.

[73] Assignee: The Ohio State University Research Foundation, Columbus, Ohio

[21] Appl. No.: 866,882

[22] Filed: May 23, 1986

[51] Int. Cl.[4] .......... B01D 59/44

[52] U.S. Cl. .......... 250/291; 250/290; 250/282

[58] Field of Search .......... 250/291, 290, 293, 281, 250/282; 364/576

[56] References Cited

U.S. PATENT DOCUMENTS

| | | | |
|---|---|---|---|
| 2,939,952 | 6/1960 | Paul et al. | 250/282 |
| 3,461,381 | 8/1969 | Nelson et al. | 250/291 |
| 3,475,605 | 10/1969 | Llewellyn | 250/291 |
| 3,511,986 | 5/1970 | Llewellyn | 250/292 |
| 3,527,939 | 9/1970 | Dawson et al. | 250/291 |
| 3,742,212 | 6/1973 | McIver, Jr. | 250/282 |
| 3,937,955 | 2/1976 | Comisarow et al. | 250/283 |
| 3,984,681 | 10/1976 | Fletcher et al. | 250/291 |
| 4,034,191 | 7/1977 | Tomlinson et al. | 235/151.3 |
| 4,535,235 | 8/1985 | McIver, Jr. | 250/282 |
| 4,540,884 | 9/1985 | Stafford et al. | 250/282 |

FOREIGN PATENT DOCUMENTS

86/04261 7/1986 PCT Int'l Appl. .

OTHER PUBLICATIONS

U.K. Patent Application GB No. 2,106,311, published Apr. 7, 1983, title: "Method for Ion Cyclotron Resonance Spectroscopy".

Barrett L. Tomlinson and H. D. W. Hill, "Fourier Synthesized Excitation of Nuclear Magnetic Resonance with Application to Homonuclear Decoupling and Solvent Line Suppression," Journal of Chemical Physics, vol. 59, No. 4, Aug. 15, 1973.

Alan G. Marshall and D. Christopher Roe, "Theory of Fourier Transform Ion Cyclotron Resonance Mass Spectroscopy: Response to Frequency-Sweep Excitation," Journal of Chemical Physics, vol. 73, No. 4, Aug. 15, 1980, pp. 1581-1590.

(List continued on next page.)

*Primary Examiner*—Bruce C. Anderson
*Assistant Examiner*—Paul A. Guss
*Attorney, Agent, or Firm*—Isaksen, Lathrop, Esch, Hart & Clark

[57] ABSTRACT

An ion cyclotron resonance cell has applied thereto an excitation which has a time domain waveform which is the inverse Fourier transform of a frequency domain excitation spectrum which has been chosen by the user to yield selective excitation and/or suppression of ranges of ion mass-to-charge ratios. To minimize the dynamic range of the time domain signal resulting from the inverse Fourier transform, the phases of the various discrete frequency components in the frequency domain spectrum which are used in calculating the inverse Fourier transform are not constant but rather are varied as a function of the frequency of the components. The phase of each component is assigned such that the frequency components in the time domain signal are not all in phase at any point in time, thereby avoiding large magnitude spikes in the time domain waveform. The phases of the various frequency components may follow a non-linear function of the frequencies of the components, such as a quadratic function. By varying phase in this manner, the time domain signal which is applied to the excitation plates of the ion cyclotron resonance cell has a frequency domain power spectrum which is substantially flat over the specified band or bands of frequencies of interest. The time domain waveform may be shifted and/or weighted before being applied to the excitation plates. Tailored excitation may also be applied in this manner to the end plates of an ion trap cell to cause tailored ejection of specific bands or ranges of ions with retention of remaining ions within the cell.

42 Claims, 10 Drawing Sheets

Microfiche Appendix Included
(1 Microfiche, 16 Pages)

OTHER PUBLICATIONS

Alan G. Marshall, Tao-Chin Lin Wang, and Tom Labatuan Ricca, "Ion Cyclotron Resonance Excitation/De-Excitation: A Basis for Stochastic Fourier Transform Ion Cyclotron Mass Spectrometry," Chemical Physics Letters, vol. 105, No. 2, Mar. 9, 1984, pp. 233–235.

Alan G. Marshall, Tao-Chin L. Wang and Tom L. Ricca, "Fourier Transform Ion Cyclotron Resonance Mass Spectrometry: New Theoretical and Instrumental Developments," ASMS Meeting, San Antonio, Texas, May 27–Jun. 1, 1984, pp. 600–601.

Paper published by Finnigan Mat, entitled "New Advances in the Operation of the Ion Trap Mass Spectrometer," presented at the 33rd Annual Conference on Mass Spectrometry and Allied Topics, San Diego, Calif., May 1985.

U.S. Patent Application Ser. No. 695,847 for "Mass Spectrometer Ion Excitation System", filed Jan. 28, 1985.

TAILORED EXCITATION FOR TRAPPED ION MASS SPECTROMETRY

This application includes a microfiche appendix listing of a computer program having sixteen frames.

FIELD OF THE INVENTION

This invention pertains generally to the field of ion mass spectrometry and particularly to ion resonance excitation therefor.

BACKGROUND ART

An ion cyclotron uses a fixed magnetic field to deflect an ion moving at some velocity through the field. For a spatially uniform magnetic field having a flux density B, a moving ion of mass m and charge q will be bent into a circular path in a plane perpendicular to the magnetic field at an angular frequency $\omega_o$ in accordance with: $\omega_o = qB/m$. Thus, if the magnetic field strength is known, by measuring the ion cyclotron frequency it is possible in principle to determine the ionic charge-to-mass ratio q/m. In effect, the static magnetic field converts ionic mass into a frequency analog. Because the cyclotron frequencies for singly charged ions ($12 \leqq m/q \leqq 5000$) in a magnetic field of about 3 Tesla span a radio frequency range (10 kHz$\leqq f \leqq$4 MHz), within which frequency can be measured with high precision, the ion cyclotron is potentially capable of offering extremely high mass resolution.

In an ion cyclotron cell, the ions may be formed by irradiation of a neutral gas or solid by various known techniques, including the application of electron, ion, or laser beams directed along the magnetic field. The ions are trapped in the cell because the static magnetic field constrains the ions from escaping anywhere in a plane perpendicular to the field and a small static trapping voltage is applied to the end plates of the cell to prevent the ions from escaping in a direction parallel to the field. However, even ions having the same mass-to-charge ratio and the same initial velocity are created at random points in time, and therefore with random phase, i.e., having random angular positions in their circular paths. These incoherently moving ions cannot produce a detectable signal in the cell. To detect the ions, it is necessary to apply an oscillating electric field in a direction normal to the magnetic field. This radio frequency electric field drives those ions having a natural cyclotron frequency equal to that of the electric field continuously outward in their orbits, whereas those ions in the cell whose natural frequency is not near to the frequency of the applied field do not resonate with the field and thus are not driven to larger orbits.

Various techniques have been used to detect the resonant ion cyclotron motion. One technique, as used in the omegatron type ion cyclotron resonance mass spectrometer, measures the current produced as ions continuously spiral outward into a detector plate. Another technique measures the power absorbed by the resonant ions from the exciting electric field. Such techniques generally rely on excitation of the cell with an oscillating electric field at a single frequency, with the frequency of oscillation being changed from time to time to scan over the desired frequency range or the magnetic field being varied to bring ions of various charge to mass ratios into resonance at a fixed frequency. Single frequency techniques were found to be badly limited with respect to both mass resolution and the time required to gather a mass spectrum. Significant increases in resolution and speed have been obtained using Fourier transform techniques wherein the whole spectrum is excited at once and the whole spectrum is thereafter detected at once. Such Fourier transform ion cyclotron resonance spectroscopy techniques are described further in the patent to Comisarow and Marshall, U.S. Pat. No. 3,937,955, the disclosure of which is incorporated herein by reference.

Since introduction of Fourier transform ion cyclotron resonance (FTICR) mass spectrometers, significant progress has been made in improving the detection of the resonant ions—for example: by reducing the base pressure in the cells, extending the bandwidth of the detection circuit, shielding of the transmitter and detector leads and using a differentially pumped dual cell. The swept frequency pulse excitation described in detail in the foregoing Comisarow, et al. patent, with detection taking place after the excitation is turned off, has been implemented for wideband excitation and is still the primary excitation used in the various presently available FTICR instruments. Ideally, such excitation signals have an essentially flat excitation power over a band of frequencies of interest to excite ions of various mass-to-charge ratios to a common orbital radius, thereby yielding a mass spectrum in which the intensities of the various peaks accurately reflect the relative numbers of ions having the mass-to-charge ratio values at which the peaks are located. Although the frequency sweep excitation has a relatively flat power spectrum compared to other types of Fourier transform excitations commonly used—e.g., single pulse excitation and pseudorandom noise—substantial variation in the excitation power spectrum is observed; that is, the spectrum is not perfectly flat but varies cyclically and substantially as a function of frequency and has relatively broad excitation band shoulders. In addition, the frequency swept excitation necessarily excites all frequencies between the lowest and highest frequency in the excitation band, and thereby does not allow selected large peaks in the ICR response to be suppressed to enhance the detectability of nearby small peaks. Such broad band excitations also cannot be used to eject ions of all but one mass-to-charge value, nor can the excitation be used to detect several specified mass-to-charge values simultaneously while suppressing detection of non-selected mass-to-charge values which may lie between the selected values.

SUMMARY OF THE INVENTION

In accordance with the principles of the present invention, a desired mass-domain excitation profile is selected by the user which would achieve a desired tailored excitation of only those mass-to-charge ratio values in which the user is interested, while suppressing other value ranges. The mass domain excitation profile is then readily converted to a frequency domain excitation spectrum in which the frequency of excitation is approximately directly proportional to the inverse of the mass-to-charge ratio for the condition of a constant magnetic field, and can be corrected for non-uniform fields. Depending on the particular ion mass spectrum analysis to be performed, the selected frequency domain spectrum may have a single broad or narrow band of frequencies at which the excitation power is uniform, several distinct bands of excitation separated by suppression bands, several bands which each have a different power level, and a band or bands which have non-constant power levels. The specified frequency domain spectrum is then supplied to a computer processor which converts the spectrum by inverse Fourier transformation to a time domain signal, which may be selectively weighted or shifted or both, which is stored by the computer for further processing. The phases of the various discrete frequency components in the frequency domain spectrum which are used in calculating the inverse Fourier transform are assigned in a manner that significantly reduces the dynamic range of the time domain signal from that which would result using the same phase for all frequency components. By selecting phases for the components of the frequency domain spectrum which vary appropriately, the frequency components in the time domain signal will not all be in phase at any point in time, thereby avoiding large magnitude spikes in the time domain waveform. Nonetheless, the time domain signal applied to the excitation plates of the ion cyclotron resonance (ICR) cell has a frequency domain power spectrum which is substantially flat in magnitude (if so desired) over the specified band or bands of frequencies of interest. Consequently, ions having resonant frequencies in the desired excitation bands will be excited and will produce a resonance spectrum which accurately reflects the relative abundance of the various excited ions.

The ion cyclotron resonance apparatus of the invention may be utilized with any of the various available ion cyclotron resonance cells which typically include excitation plate electrodes, detection plate electrodes, and trapping end plates. The signals from the excited ions in the cell are detected, amplified, and then analyzed by a control computer in the usual fashion using well-known Fourier transform techniques. The desired mass domain excitation profile is programmed by the user into the computer, which converts it to a frequency dOmain profile. This frequency domain spectrum is then converted by the computer through an inverse Fourier transform to a time domain waveform which is to be applied over a specified time interval. The computer samples the specified frequency domain spectrum at discrete frequencies for purposes of accomplishing the Fourier synthesis and the phases of the frequency components are assigned by the computer to vary as a non-constant function of frequencies of the components such that the frequency components are not all in phase at any point in time. The data set consisting of the frequency magnitudes and phases is then inverse Fourier transformed to create the time domain waveform data set which is stored in memory. This data set may be appropriately weighted in magnitude by a weighting function, or shifted as by reflection about the center of the interval of application of the time domain signal. Phase variation functions which have been found particularly advantageous are quadratic and higher order polynomial functions of frequency, including such functions which are continuous but only piece-wise smooth, although functions having one or more discontinuities may also be utilized.

During excitation, the digital data from the memory is delivered in a desired time sequence to a digital-to-analog converter which generates a time varying waveform in accordance with the magnitude of the data words from the memory. The time domain signal may be directly provided to the excitation plates of the ICR cell. Optionally, the time varying signal may be mixed with a first higher frequency carrier signal to generate a modulated signal which is then provided to the excitation plates of the ICR cell. Correspondingly, the output signal from the detection plates of the cell is then mixed with a second high frequency signal to provide a mixed signal which may be low-pass filtered to pass the difference frequency portion of the mixed signal to an analog-to-digital converter which feeds the digitized information to the computer for Fourier transform analysis.

Under certain conditions it is also desirable, to improve the uniformity of the power spectrum of the time domain signal, to apply a weighting function envelope to the time domain signal. It is generally preferred that such a weighting function increase smoothly from zero magnitude at the beginning of the time domain waveform interval and decrease smoothly to zero at the end of the interval.

Although it is preferred that the excitation signal be applied to the excitation side plates of the ICR cell, it is possible to obtain ion selective excitation or ejection by applying the excitation signal, tailored in accordance with the present invention, to the end plates of the ICR cell. The principles of the present invention may be further extended to utilization with ion-trap devices, which are similar to ICR cells but generally have hyperbolically curved rather than flat or circular side plates and a different curvature for the end plates than for the side plates. Such ion trap devices operate in the absence of an applied magnetic field and store ions over a mass range determined by the magnitudes of radio frequency and DC voltages applied to the plates of the ion trap. By applying a time domain signal to the end plates of the ion trap, generated in accordance with the present invention from a tailored frequency domain spectrum, it is possible to eject selected ions longitudinally from the ion trap by exciting the selected mass dependent trapping frequencies, thereby ejecting those ions having specific mass-to-charge ratios.

Further objects, features, and advantages of the invention will be apparent from the following detailed description when taken in conjunction with the accompanying drawings.

DESCRIPTION OF THE PREFERRED EMBODIMENT

Figure 1:
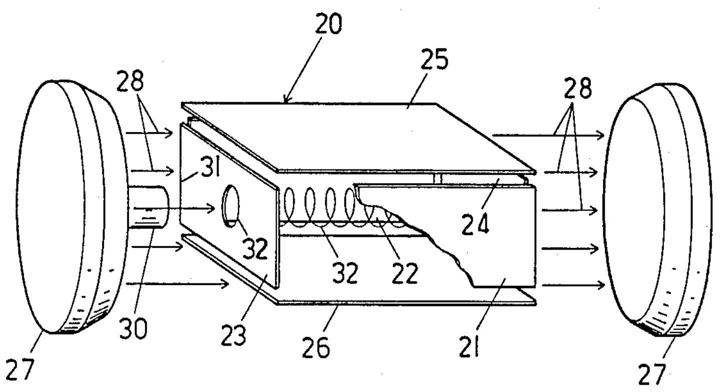
FIG. 1 is a simplified view of an ion cyclotron resonance cell to which tailored excitation signals of the present invention may be applied.

With reference to the drawings, a schematic perspective view of an exemplary ion cyclotron resonance cell is shown generally at 20 in FIG. 1. As is well-known in the art, the ion cyclotron resonance (ICR) cell 20 would be enclosed in an evacuable chamber (not shown) and a vacuum pump (also not shown) and other ancillary equipment standard for ICR cells would be utilized to achieve the desired low pressure in the cell. After the cell has been pumped down to the desired pressure, a gas sample to be analyzed may be introduced into the cell or adjacent to it from a suitable source in a manner well-known in the art. For purposes of illustration, the ICR cell 20 is shown as having a substantially rectangular cross-section, a parallelepiped form, with opposed side plates 21 and 22 serving as excitation electrodes, end trapping plates 23 and 24, and top and bottom plates 25 and 26, respectively, which may serve as detector electrodes. Various other geometric configurations for ICR cells, such as cylindrical or hyperbolic forms, multiple sets of plates, etc., are known and may also be utilized. The ICR cell 20 is maintained in a substantially constant and preferably uniform magnetic field of flux density B produced by an electrical (or permanent) magnet 27 of any suitable construction, with the field direction being oriented longitudinally, generally between the end plates 23 and 24, as represented by the lines of flux labeled 28. It is understood that other magnet configurations may also be used, including a solenoid magnet which surrounds the ICR cell.

Various means of producing ions in the cell 20 are well known and may be used. For purposes of illustration, an ion generating source 30, such as an electron gun, a laser, or other source of ionizing energy, may provide a beam 31 which passes through an opening 32 in the front end plate 23 and causes ionization of gas (or solid) molecules within the cell, although the ions may also be formed outside the cell and then transferred inside using techniques well known in the art. These ions are constrained to move in a cycloidal path 32 within the ICR cell 20 by interaction with the constant magnetic field and are trapped within the cell by bias voltages applied to the plates of the cell. The construction details and operation of ICR cells is well-described elsewhere in various technical papers and patents, for example, in the foregoing Comisarow, et al. patent, and need not be further described here to illustrate the present invention.

Figure 2:
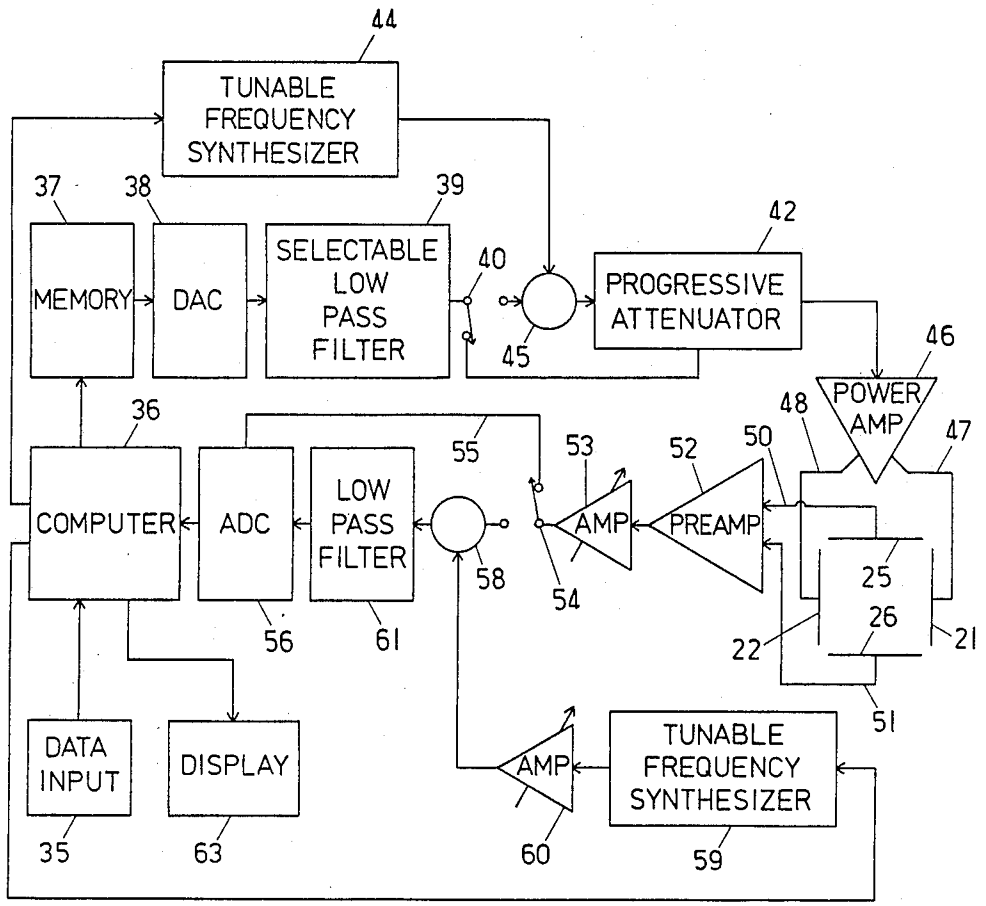
FIG. 2 is a block diagram of an ion cyclotron resonance mass spectroscopy system incorporating the present invention.

A block diagram of a tailored excitation ion cyclotron resonance mass spectroscopy system embodying the present invention is shown in FIG. 2. A data input device 35, e.g., a keyboard, interactive graphics unit, or a magnetic media reader, receives data from the operator indicating the selected mass spectrum or corresponding frequency domain spectrum which the operator has determined will best suit the mass spectroscopy analysis he wishes to perform. The data received by the data input device 35 is provided to a programmable digital computer 36, e.g., a Nicolet 1280 computer incorporated in a Nicolet Instrument Corporation FTMS-1000 instrument, which carries out an inverse Fourier transform on the data supplied to it, in accordance with well-known techniques, and generates output data indicative of the desired time domain waveform over a specified time interval which is written into a digital memory 37. Under the control of the computer 36, the data from the memory may be read out to a digital-to-analog converter 38 which provides an analog output signal to a selectable low pass filter section 39 which filters out frequencies in the analog signal which are above the frequencies of interest. For example, for heterodyne operation as described further below, the output of the digital-to-analog converter 38 may have a primary signal in the 5 kHz to 100 kHz range, with the filter 39 then acting to filter out any harmonics or noise components at frequencies above the desired signal frequency range. The system can also operate in a direct mode in which the filter 39 would filter only frequencies above the normal ICR frequency range, e.g., above about 2 MHz. In the direct mode, a switch 40 is set in the position shown in FIG. 2 such that the output of the filter 39 is provided on a line 41 directly to a progressive attenuator 42 which is programmable to attenuate the signal by up to 64 dB in 0.25 dB steps. Alternatively, the system can operate in a heterodyne mode in which a first high frequency carrier signal is provided from a tunable frequency synthesizer 44 under the control of the computer 36 to a mixer 45 and wherein the switch 40 is switched to its alternate position in which it provides the output signal from the filter 39 to the mixer 45. The output of the mixer 45, containing a double sideband modulated signal centered on the frequency of the output of the tunable frequency synthesizer 44, is provided to the progressive attenuator 42. The output of the attenuator 42 is supplied to a power amplifier 46 which delivers the time varying voltage output signal on the lines 47 and 48 to the excitation electrodes 21 and 22, respectively, with the signals on the lines 47 and 48 being 180 degrees out of phase with one another. The time varying voltages applied to the plates 21 and 22 produce a corresponding time varying electric field in the ICR cell which is oriented transverse to the applied magnetic field.

As explained further below, the signal supplied to the plates 21 and 22 excites various resonant responses in the ions within the cell. These responses are detected as voltage signals on one or both of the detector plates 25 and 26, and the potentials at these plates are transmitted on lines 50 and 51 to a preamplifier 52. The output signal from the preamplifier 52 will be a time varying signal having frequency components indicative of the particular ions that have been excited by the time varying electric field previously applied to the ions in the cell. The output signal of the preamplifier 52 is directed to a variable gain amplifier 53 which provides its amplified output to a switch 54 which is positioned for either a direct or heterodyne mode of operation. In the direct mode position, as shown in FIG. 2, the output of the amplifier 53 is passed on a line 55 directly to an analog-to-digital converter 56 which digitizes the signal and provides the digitized data to the computer 36. Alternatively, if the heterodyne mode of operation is chosen, the switch 54 is turned to its other position to provide the signal from the amplifier 53 to a mixer 58 which also receives a second high frequency input signal from a tunable frequency synthesizer 59 as passed through a variable gain amplifier 60. The mixing of the output signal of the preamplifier 53 and the signal from the synthesizer 59 results in an output from the mixer having sum and difference frequency components. It is apparent that the second high frequency carrier signal from the synthesizer 59 may be at a frequency different from the frequency of the first carrier signal from the synthesizer 44, although the two frequencies may also be equal under appropriate conditions. A low pass filter 61 passes just the difference frequency components to the analog-to-digital converter 56. The digital data from the converter can be stored for later processing by the computer 36, and a fast Fourier transform may be performed on the data to provide an output display on a display device 63, e.g., an X-Y plotter or an oscilloscope, which is indicative of the frequency spectrum or the mass-to-charge ratio spectrum of the detected signal from the ICR cell.

Figure 3:
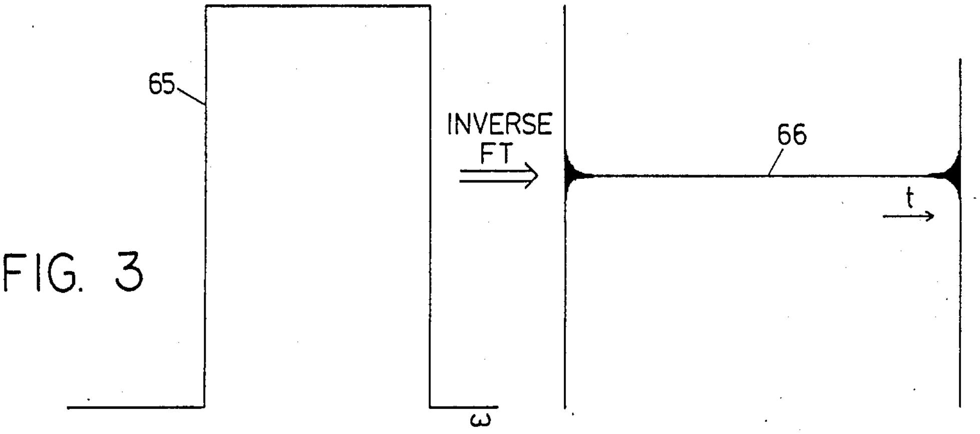
FIGS. 3–5 are illustrative graphs of certain frequency domain spectra and their corresponding inverse Fourier transform time domain signals.
Figure 4:
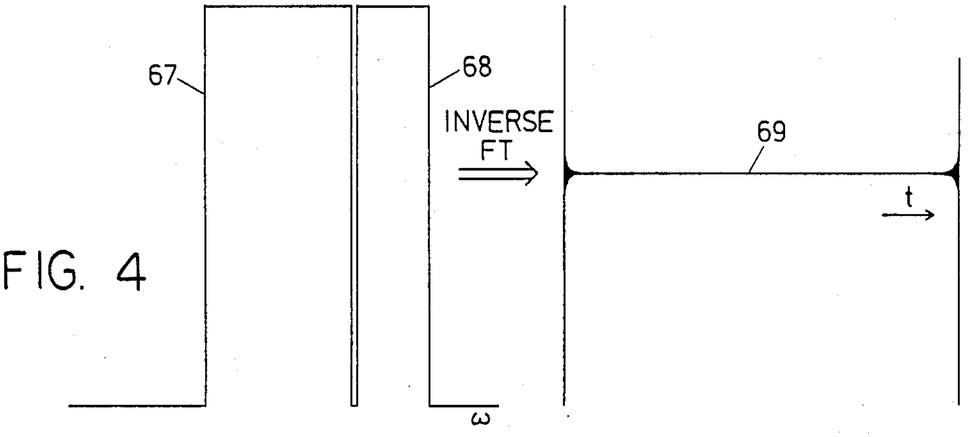
Figure 5:
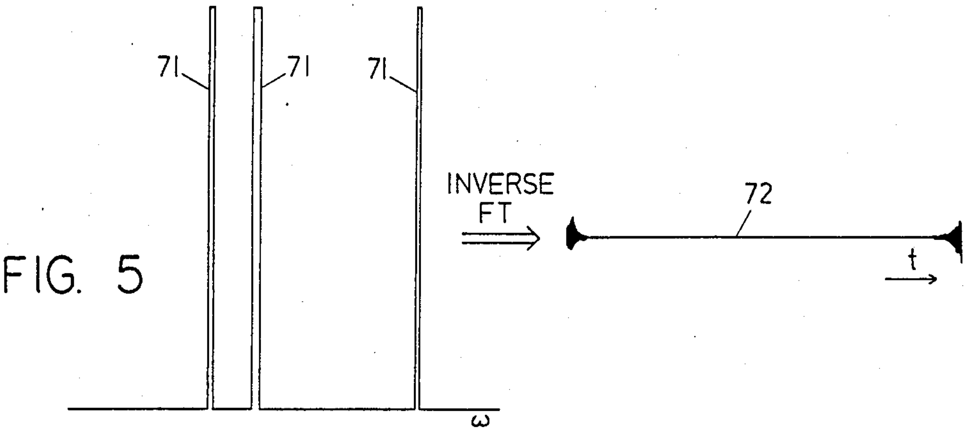

Examples of tailored frequency domain excitation spectra and their corresponding inverse Fourier transform time domain excitation waveforms are shown in FIGS. 3–5. In FIG. 3, a uniform power magnitude band 65 in the frequency domain spectrum results in a time domain signal, after an inverse Fourier transform operation using uniform phases for the frequency components of the spectrum, as illustrated at 66. This time domain waveform has very large amplitude spikes at the beginning and end of the wave form interval and very low amplitude between the spikes. Similarly, as shown in FIG. 4, a substantially rectangular excitation band frequency domain spectrum 67 having a single narrow notch 68 therein results upon inverse Fourier transformation in the time domain waveform labeled 69, which again has large amplitude spikes at the beginning and end of the waveform interval. In FIG. 5, multiple separated, large amplitude pulses 71 are specified in the frequency domain and result, upon inverse Fourier transformation, in the waveform 72 in the time domain. The waveform 72 does not have the extreme amplitude spikes seen for the waveform 66 and 69, but still has a relatively large dynamic range, with most of the power being concentrated in the portions of the waveform at the beginning and the end of the waveform interval and very little power in the portion of the signal in between.

Figure 6:
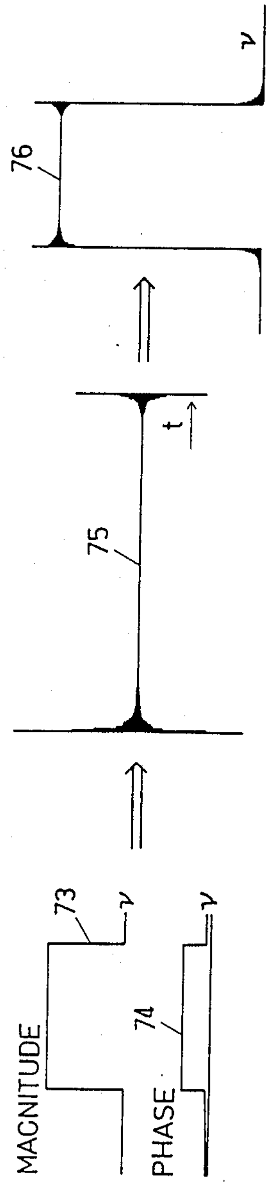
FIGS. 6–8 are graphs each illustrating the conversion of a specified frequency domain spectrum by an inverse Fourier transformation to a time domain signal which is reflected about its abscissa midpoint, zero-filled equally at each end to give a data set with twice the number of points, and Fourier transformed back to the frequency domain.

The large dynamic ranges required for the time domain signals illustrated in FIGS. 3–5 create several practical problems. First, because most of the excitation power is concentrated into a small fraction of the time domain excitation period, the excitation amplitude must be much larger (e.g., about a factor of 20) than for frequency-sweep excitation which has approximately constant time domain peak-to-peak amplitude. Second, the computer word length used in the digital computer which generates the data for the memory 37 limits the digital data dynamic range, both for data storage and computations. Third, the large dynamic range of voltages which must be passed to the plates 21 and 22 severely tests the linearity and transient analog response of the circuitry which provides these voltages to the plates. The circuitry may simply not be able to deliver the desired amount of total signal power to the plates because of saturation during the large amplitude spikes. As illustrated in FIG. 6, a single flat excitation band 73 in the frequency domain spectrum with constant phase 74, having an inverse Fourier transform time domain waveform 75 (similar to the frequency spectrum 65 and the time domain waveform 66 of FIG. 3), results in a signal which, when symmetricized, zero filled and Fourier transformed back to the frequency domain, has a frequency domain spectrum as illustrated at 76 in FIG. 6—a magnitude spectrum substantially less uniform than the original specified spectrum 73.

The large dynamic range of the time domain waveforms, or concentration of signal power in short spikes, discussed above results from the common phase relation between all of the frequency domain excitation spectral components; that is, each of the components is a pure cosine with zero phase delay. Thus, there is a sharp maximum in the time domain signal at the beginning of the time domain waveform because each of the spectral components is a cosine which starts out at a maximum at time zero.

Figure 7:
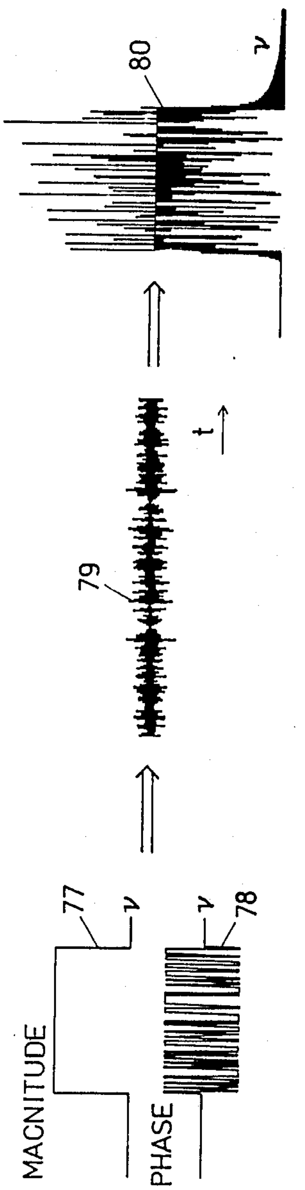

In accordance with the present invention, the large dynamic range in the inverse Fourier transform time domain waveforms can be substantially reduced by encoding the phase of the spectral components of the specified frequency domain waveform so that the phase coherence of the spectral components is eliminated. Each of the discrete frequency components is assigned a phase value which varies over the components so that the frequency components are not all in phase at any point in time. Many non-constant phase functions may be utilized in accordance with the invention, including non-linear continuous functions and functions having one or more discontinuities. Generally, a purely linear change in phase with the frequency of the spectral components is not as preferred as a non-linear function in that a linear shift in phase in the frequency domain may result in a time domain signal shifted only in time. For example, a uniform or flat-band frequency domain magnitude spectrum, such as illustrated in FIG. 7 at 77, can be sampled at multiple points (typically 1024 to 4096 points) over the frequency range of the band 77 to get discrete spectral frequency components and the phase of the frequency component at each sample point may then be multiplied, point by point, by a pseudo-random sequence consisting of, for example, +1 and −1, to provide a cyclic function having multiple discontinuities, as illustrated in the graph labeled 78 in FIG. 7. The inverse Fourier transform of the power spectrum 77, having phase angles assigned in accordance with the pseudo-random phase function, illustrated by the graph 78, results in a time domain signal as illustrated at 79 in FIG. 7, which has approximately uniform magnitude throughout the excitation period, thereby greatly reducing the dynamic range of the time domain signal and distributing the power in the signal over the entire waveform interval. A Fourier transform of the signal 79, following reflection of the data set of the signal about its center, and addition of zero valued data points at each end to give a time-domain data set with twice the number of points as in the original time domain data set, results in a magnitude spectrum illustrated at 80 in FIG. 7. Similar reflection and zero fill steps were used to generate the magnitude spectra shown at the right hand side of FIGS. 6 and 8. The excitation power at the specified discrete spectral frequency components is found substantially constant across the power spectrum 80 but the excitation power at frequencies between the specified frequencies is found to be widely variant. Thus, although the cyclic, pseudo-random phase function 78 desirably distributes power over the waveform interval and reduces dynamic range, it may not provide a sufficiently uniform frequency domain spectrum for many types of excitation or ejection analyses. As noted further below, a pseudo-random phase function may be satisfactory where the excitation bands are relatively narrow.

Figure 8:
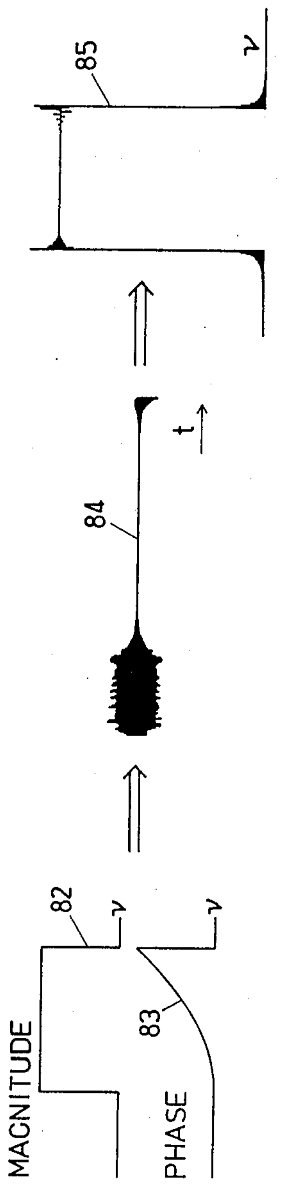

A preferred form of phase encoding in accordance with the present invention is illustrated in FIG. 8 for the case of a single excitation band frequency domain spectrum 82 which is substantially flat in magnitude at all frequencies sampled. However, the phase angle of the discrete frequency components from the spectrum 82 is chosen to vary as a function of frequency in a continuous and non-linear fashion, as illustrated by the graph labeled 83 in FIG. 8. The function 83 is a quadratic function of frequency varies continuously over the entire frequency range of the specified excitation band 82. Although a quadratic function is illustrated, it should be understood that higher order polynomial phase functions provide comparable effects. When such an excitation spectrum is inverse Fourier transformed, the time domain waveform illustrated at 84 is formed, which is shown to have a dynamic range significantly smaller than the dynamic range of the waveform 75 of FIG. 6 which resulted from the inverse Fourier transformation of a frequency domain spectrum having constant phase. When the time domain signal 84 is reflected about its center, which may be considered a shifting of the signal, and zero valued data points added at each end to give a time-domain data set with twice the number of points as in the original time domain data set, and then Fourier transformed, the resulting frequency domain spectrum 85 is found to be substantially flat over all of the frequencies of interest, including frequencies between the specified sample frequencies at which phases were assigned in accordance with the phase variation function represented by the graph 83 in FIG. 8. In practice, the actual frequency domain spectrum of the electric field in the ICR cell resulting from the time domain signal 84 will typically be much better than the spectrum in the ICR cell from the excitation 75 because of saturation and other non-linearities likely to occur in the excitation circuitry when the excitation waveform 75 is used.

Figure 9:
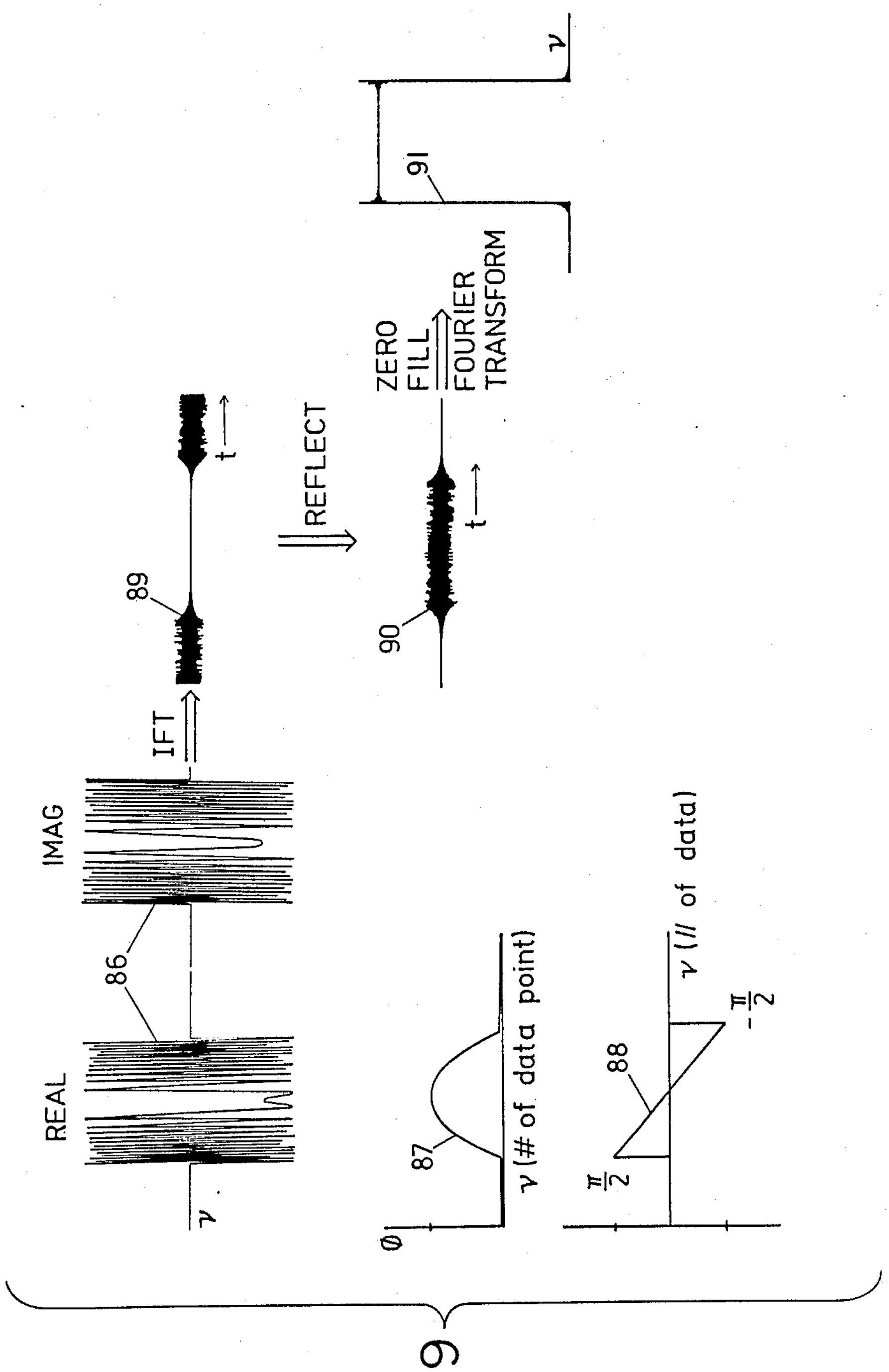
FIG. 9 is a graph illustrating the conversion from the frequency domain to the time domain and back to the frequency domain of a specified frequency domain spectrum in which the phase of the frequency components in the spectrum varies continuously and non-linearly.

The graph in FIG. 9 shows the real and imaginary parts of a complex frequency-domain signal whose magnitude spectrum is shown at 82 in FIG. 8 and whose phase variation is described by the function 87. The slope of the function 87 is shown in the graph 88. Inverse Fourier transformation of the function 86 produces the time domain data set signal 89 which is shifted or reflected about its center to give the time signal 90, and then zero-filled and Fourier transformed to give the magnitude frequency spectrum 91. It is seen that the spectrum 91 is quite similar to the spectrum 85 of FIG. 8 even though a parabolic phase function 87 was used. In fact, many possible quadratic-based phase encoding schemes (as further described below) lead to similar magnitude frequency spectra.

Figure 10:
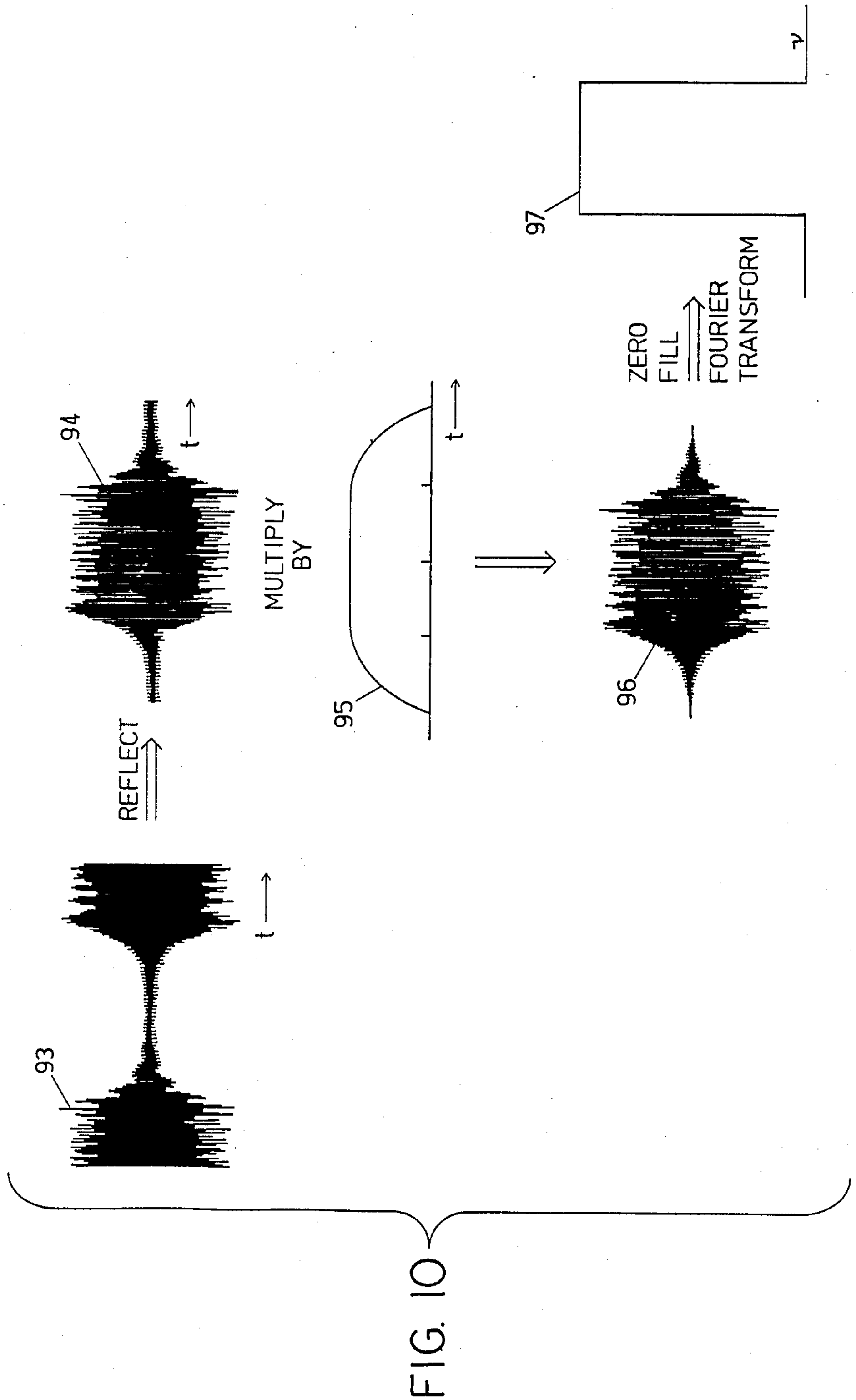
FIG. 10 is a graph illustrating the apodization of a tailored time domain waveform.

To further reduce the slight variation seen in the magnitude spectrum represented by the graph 85, the user may selectively apply a weighting or apodizing function to the time domain signal. This is illustrated in the graphs of FIG. 10 in which the time domain signal 93, resulting from the inverse Fourier transform of the frequency domain magnitude spectrum 82 with quadratic phase variation 83, is reflected or shifted about its center to give the time domain signal 94, and then has an envelope weighting function 95 superimposed thereon, that is, the weight function 95 amplitude is mutliplied by the time domain waveform 94 to yield the weighted time domain waveform 96. The function 95 attenuates the beginning and end of the time domain signal 94, providing a monotonic increase at the beginning of the waveform interval, a monotonic decrease at the end of the waveform interval, and a substantially constant maximum level therebetween. Fourier transformation of the weighted time domain signal 96 produces a magnitude spectrum 97 which is substantially flat over the entire excitation range of interest. Various weighting functions may be utilized, with the preferred feature of the function being that it goes continuously to zero magnitude at both the beginning and the end of the time domain waveform interval. It may be noted that the power in the time domain waveform 96 is distributed relatively broadly over the waveform interval and is not concentrated at any particular segment of the interval, as is the power in the waveform 76 resulting from the specification of a power spectrum having constant phase. Consequently, a weighting function may be applied to the waveform 94 which attenuates the waveform at the beginning and end of the waveform interval without substantially distorting the power spectrum of the time domain signal.

Figure 11:
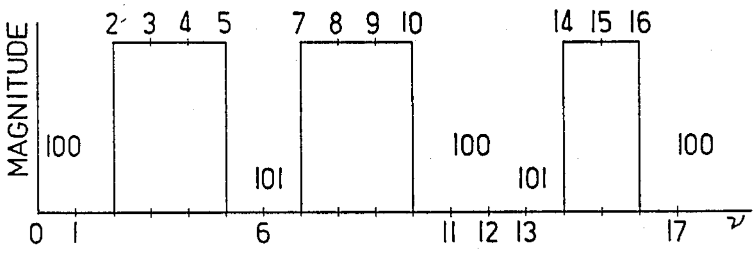
FIG. 11 is a graph illustrating an exemplary tailored excitation spectrum having multiple excitation bands.

Examples of various non-linear phase variation functions that may be utilized in the present invention, and their application to a specified frequency spectrum having separated bands in the spectrum are illustrated in FIGS. 11–14. In FIG. 11, the magnitude of an exemplary desired spectrum has multiple bands 100 containing frequencies at which excitation is desired, separated by ranges 101 in which substantially no excitation is to be provided.

Figure 12:
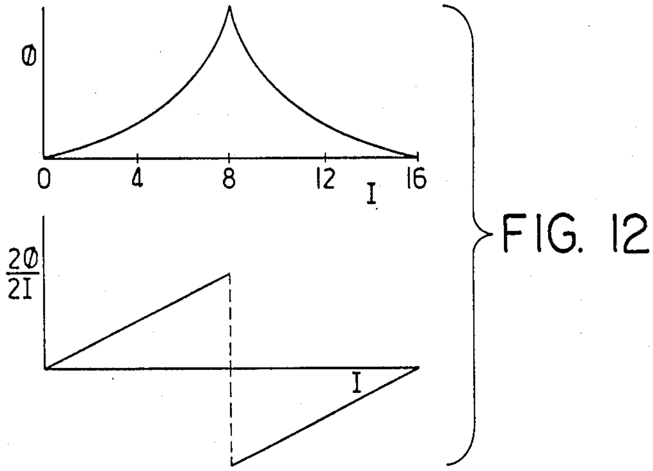
FIGS. 12–14 are illustrative graphs showing various phase variation functions that may be utilized in accordance with the present invention.
Figure 13:
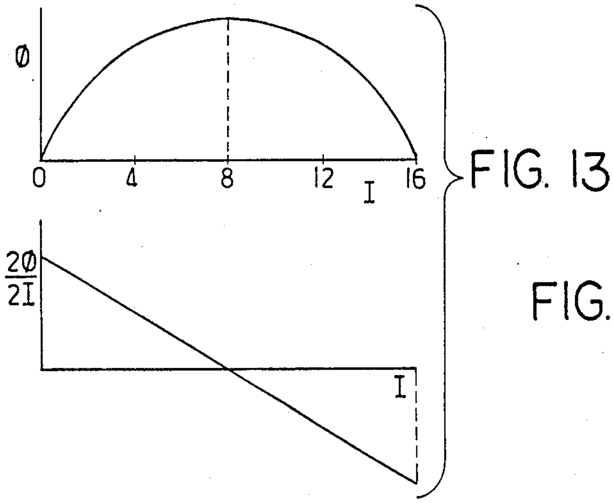
Figure 14:
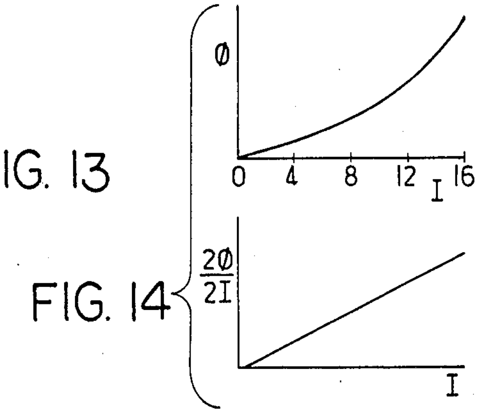

As noted above, it is preferred that the phase at each of the discrete frequency components vary nonlinearly as a function of frequency over the band of excitation frequencies. For the case of a single excitation band, the phase angles of the selected frequency components may vary as a continuous function of the frequency over the range from the start to the end of the excitation band. For the multiple excitation bands 100 separation by zero excitation regions 101 illustrated in FIG. 11, it is preferred that a single function be utilized which spans the entire range of all of the excitation bands. To illustrate the preferred application of the assignment of phase variations to such multiple bands, it is noted that the frequency range of the bands 100 is assigned regularly spaced frequency points thereon labeled (for illustration) 0, 1, 2, 3, . . . 15, 16, 17, separated by equal frequency intervals, constituting a set of monotonically increasing numbers which maps uniquely from the frequency values of the chosen frequency components, although typically many more points (e.g., 1024) would be chosen. The phase function can then be a function of a frequency component variable I on this set of numbers. Various suitable quadratic phase functions are illustrated in FIGS. 12–14 along with the derivative of these functions with respect to the variable I. In the case of the functions illustrated in FIGS. 13 and 14, the phase functions are pure quadratic polynomials of the form $\phi(I)=\phi_o+AI+(B/2)I^2$ ($\phi_o$, A and B constants) having a linear and continuous derivative of the form $d\phi/dI=A+BI$. For the case of the function of FIG. 12, the phase function is continuous but is formed of two segments of a quadratic polynomial and is piecewise smooth so that over each half of the phase variation range the rate of change of phase is a linear and continuous function. Although the functions shown in FIGS. 12–14 are illustrated with respect to the multi-banded magnitude spectrum of FIG. 11, it is clear that they could as well be utilized with a single excitation band. It should also be noted that other higher order polynomials may similarly be utilized for the non-linear variation of phase with frequency. Generally, a non-linear phase function as shown in FIG. 14 insures that no two frequencies sampled from the spectrum will have exactly the same initial phase, thereby generally lowering the dynamic range of the resulting time domain signal. It has been found that the absolute value of the derivative or rate of change of phase with respect to the frequency component I preferably should not exceed $\pi$ radians per frequency component point to obtain a desirably flat excitation spectrum magnitude. Generally, it has been found that the greater the slope of the derivative of phase with respect to frequency component I, the greater will be the reduction in dynamic range of the time domain waveform, subject to the constraint that the absolute value of the derivative should preferably not exceed $\pi$ over the frequency component set. As a general observation, a larger rate of change in the phase function results in a greater spread of signal power over the waveform interval but an increase in the variation of the resulting frequency domain power spectrum. Utilization of a phase function with a derivative magnitude no greater than about $\pi$ has been found to yield satisfactory results under most conditions.

The ICR system illustrated in FIG. 2 can be used with various modes of excitation, including direct mode excitation alone, heterodyne excitation alone, or combinations of excitations using both a direct mode and a heterodyne mode. In the direct mode, a time domain waveform covering the entire desired frequency range is programmed into the memory 37 and supplied out through the digital-to-analog converter 38 to the excitation plates 21 and 22. In the heterodyne mode, the memory 37 could be written with time domain data corresponding to a tailored frequency domain spectrum covering substantially only the range of frequencies of interest, in a manner analogous to present heterodyne mode operation. For example, the range of frequencies from the start to the end of a desired excitation band may be 5 kHz to 100 kHz, although the center of the excitation band may be in the range of several hundred kilohertz to 1 to 2 megahertz. The memory 37 would thus be programmed with a time domain signal which would contain only the frequencies from zero to the upper limit of the range of the excitation band, and the selectable low pass filter 39 would filter out any higher extraneous frequencies before the signal was provided to the mixer 45 for mixing with a first higher frequency "carrier" signal from the synthesizer 44. The entire double sideband modulated output signal then would be applied through the progressive attenuator 42 to the excitation plate electrodes 21 and 22. The frequency of the synthesizer output is selected such that one of the sidebands containing the modulating signal from the memory 37 is at the correct frequency for exciting the desired resonance frequencies in the ICR cell. It is not generally necessary (although possible) to cancel the other sideband before applying the modulated signal to the excitation plates since the second higher frequency carrier signal provided from the tunable frequency synthesizer 59 and mixed with the detected signal in the mixer 58 can be chosen to provide a mixed signal with a difference frequency band extending from near 0 Hz up to the maximum extent of the excitation band of interest. The frequencies above the range of frequencies of interest are filtered out by the low pass filter 61 before the signal is applied to the analog-to-digital converter 56.

Figure 15:
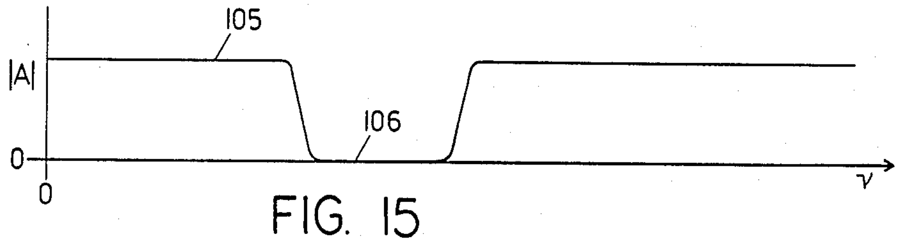
FIG. 15 is an illustrative graph showing a frequency domain spectrum for a low resolution tailored excitation having a suppression band.
Figure 16:
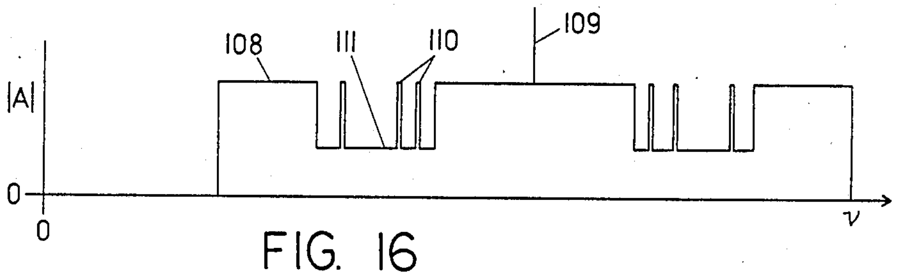
FIG. 16 is an illustrative graph of a frequency domain excitation spectrum having a carrier frequency modulated tailored excitation spectrum in which several specific values of mass-to-charge ratio are excited.

For performing extremely high resolution mass spectrometric operations, two (or more) separate excitation operations may be used. In the first operation, a broad band direct mode excitation is provided as illustrated in FIG. 15 by the graph 105, in which all frequencies are excited except for a band of frequencies 106 in the area of interest. This initial operation results in substantial ejection of all ions having resonant frequencies above and below the range of frequencies of interest. Inasmuch as this first operation is not intended to provide high resolution and a sharp discrimination between the resonant ions ejected and those unexcited, the edges of the notch area 106 need not be extremely sharp. A second excitation operation then follows which utilizes a heterodyne mode, high resolution tailored excitation. The graph 108 of FIG. 16 illustrates an exemplary power spectrum for a heterodyne excitation signal in which the two sidebands, each corresponding to the tailored excitation, extend on either side of a peak 109 corresponding to the carrier frequency. The high resolution heterodyne operation may be constructed to have several advantageous features. First, it may be arranged to eject all ions having resonant frequencies in the vicinity of the edges of the low resolution ejection notch 106 to provide a high resolution edge for the final excitation. It may also be structured to eject specific ions within the notch with high resolution, and to provide a lower power excitation for all other ions inside the notch. This is also illustrated in FIG. 16 in which peaks 110 are provided corresponding to frequencies which are to be ejected and a base excitation level 111 is provided to excite all remaining ions within the band of interest. One particular advantage of utilizing a low resolution ejection operation prior to the high resolution heterodyne operation is that the ions having resonant frequencies above the heterodyne carrier frequency 109, which would otherwise be excited by the upper sideband, will have previously been ejected from the ICR cell by the low resolution direct mode operation. The second heterodyne mode operation may thus provide notch ejection of all ions outside a notch band, specific ion ejections within the band, and excitation of the remaining ions in one event. This single step process allows high resolution ejection of unwanted ions with excitation of remaining ions in a short time interval to limit the occurrence of chemical ionization and similar effects which could be a problem if multiple ejection-/excitation events were used.

Figure 17:
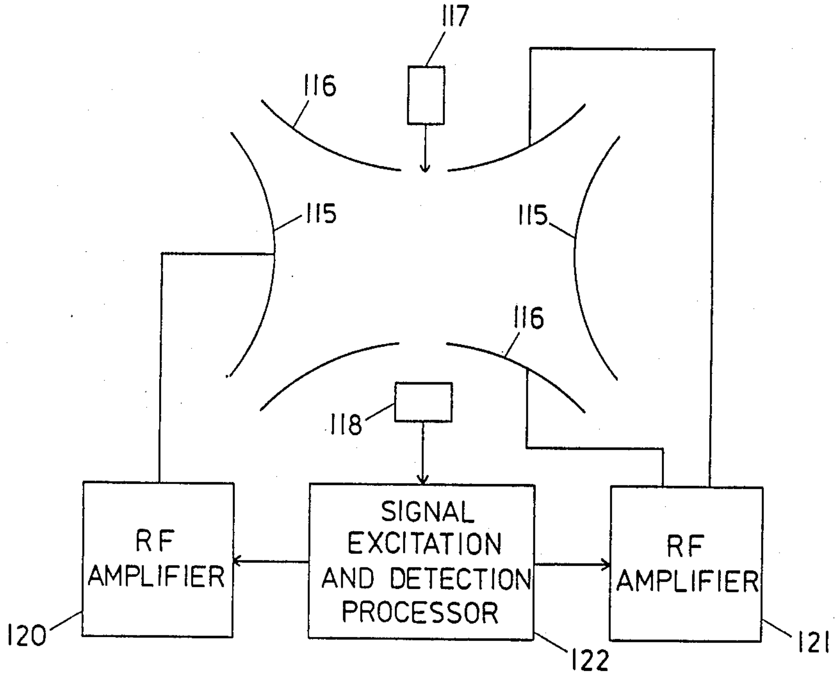
FIG. 17 is a schematic view of an ion trap structure illustrating the application of a tailored excitation signal to the end plates of the trap to achieve selective ejection of ions therefrom.

Although the present invention has been illustrated with respect to an ion cyclotron resonance cell, it is understood that the tailored excitation principles may similarly be applied to analogous structures, such as the ion trap, which do not utilize a constant ambient magnetic field. Such an ion trap is illustrated in FIG. 17, having a ring electrode 115, end plates 116, an ionizing beam source 117 such as an electron gun, and a detector of ejected ions 118. Appropriate trapping voltages are applied to the ring electrode 115 and end plates 116 through radio frequency amplifiers and biasing circuits 120 and 121 to cause trapping of the ions within the plates in well-known manner. The tailored excitation functions of the present invention may be applied to the end plates 116 by a computer controlled signal excitation and detection processor 122, in the same manner as the excitation of the plates 21 and 22 of the ICR cell 20 as described above, to achieve tailored excitation and ejection of ions from the ion trap. The ejected ions can be detected by the detector 118 and analyzed by the processor 122 to provide a mass spectrum of the ejected ions. By applying the excitation principles of the present invention, ejection can be obtained of all masses within an excitation band or ejection of all masses above and below a selected band.

In accordance with the present invention, tailored excitation may be applied to the cell in a time-shared manner with detection, sometimes called "stochastic" excitation and detection. In a time-shared mode, the time domain excitation waveform is stored in the memory 37 as above, but would not be fed directly to the digital-to-analog converter 38 which is utilized in the system of FIG. 2 to generate a continuous time domain signal. In the time-shared mode, each data point from the memory 37, corresponding to the magnitude of the desired time domain waveform at that instant, is translated to a pulse having an area proportional to the desired time domain amplitude, with the sequence of pulses corresponding to the data read out sequentially from the memory 37 being applied to the plates 21 and 22. The pulse areas may be varied by using pulses of constant amplitude and varying duration, pulses of constant duration and varying amplitude, and pulses of constant amplitude and duration but varying phase. The signal from the detector plates 25 and 26 is gated so that it is detected only during the intervals between pulses supplied to the excitation plates, developing data in a time-shared manner which is indicative of the response of the ions within the cell to the pulse encoded time domain excitation waveform.

Figure 18:
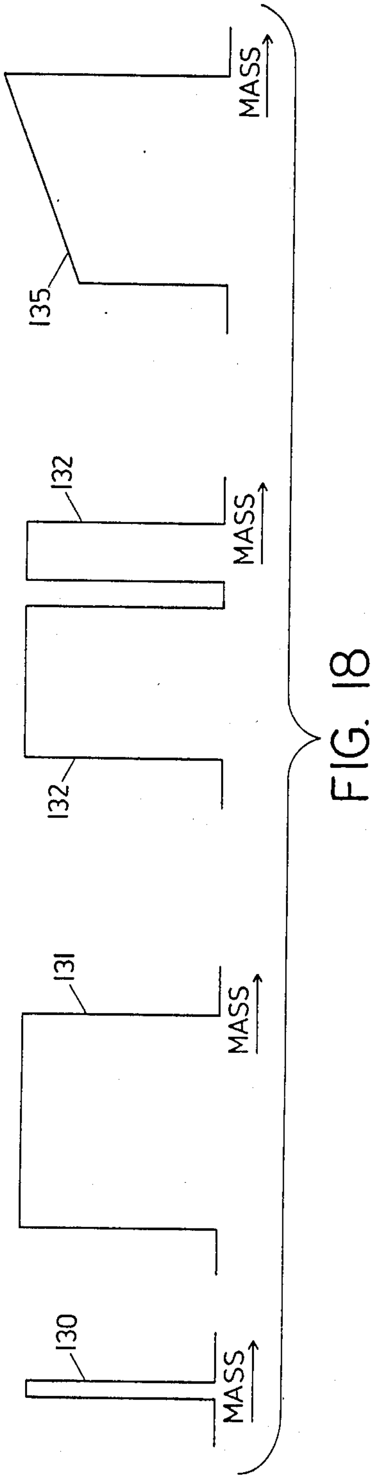
FIG. 18 are graphs illustrating examples of tailored excitation profiles.

The present method and apparatus are extremely general in application to mass spectrometry and are not limited to the examples illustrated herein. It is evident that a great variety of excitation spectra can be tailored in accordance with the principles of the present invention to meet specific needs. FIG. 18 provides several illustrative, but by no means exhaustive, examples of various spectra that can be tailored in the frequency domain and which can be applied either individually in a single experiment or in combination in multiple sequential excitations. The single narrow excitation peak 130 can be utilized to excite (or eject, if large enough a magnitude) a narrow band of ions, the broad band excitation spectrum 131 can be utilized to eject or excite a broad band of ions, the spectrum 132 having a narrow notch 133 in it can be utilized to excite or eject all ions in a broad band, except for those in a narrow band 133, and a mass spectrum 135 having a continuously increasing magnitude can be used to differentially excite some mass ranges more than others. Of course, more complex non-constant mass functions could be utilized, including trapezoidal non-linear spectral functions. As is evident, it is possible to apply different excitation waveforms in succession, separated by a controllable delay period. For example, the excitation profile 132 could be applied first to eject all but ions in a narrow range 133 of mass-to-charge ratios. Next the narrow band profile 130 may be applied to excite specific ions to higher translational energy so that they are induced to fragment by collision with neutrals. Next, a broad band excitation 131 may be applied to detect the parent and daughter fragment ions. In this so-called mass spectrometry/mass spectrometry (MS/MS) experiment, a single mass spectrometer can provide the two mass-selection steps which previously required two separate mass spectrometers.

Figure 19:
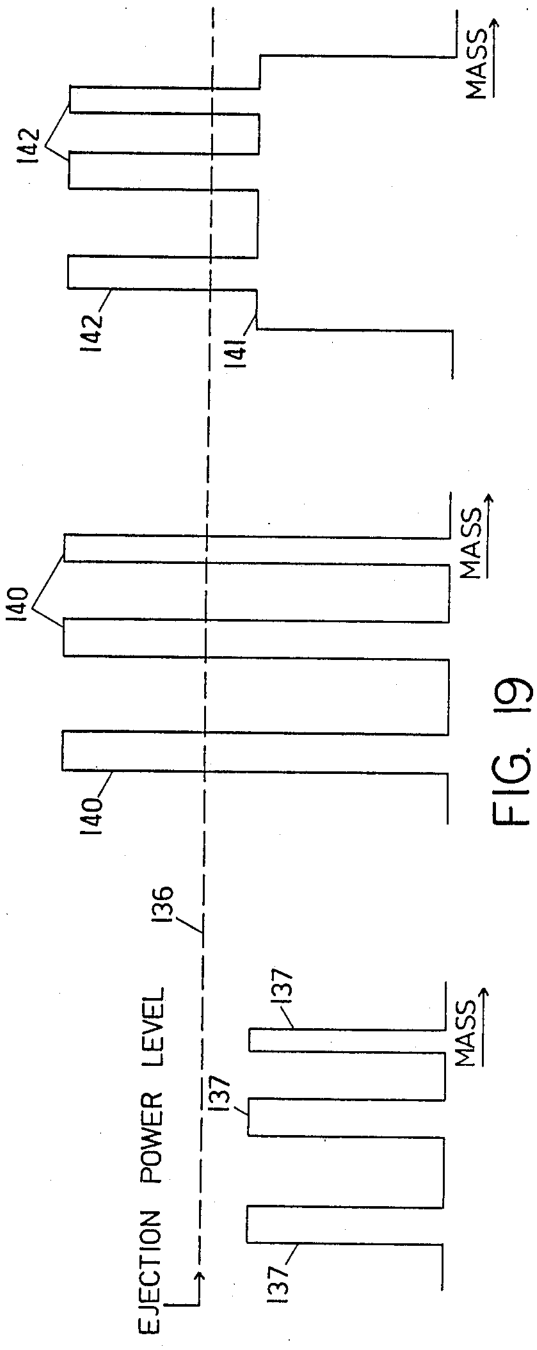
FIG. 19 are graphs illustrating several tailored excitation profiles relative to an ion ejection power level.

It is also evident that excitation steps conducted separately in prior art instruments can be performed in a single step in accordance with the present invention. Such applications are illustrated in FIG. 19, which shows exemplary excitation waveforms with respect to an ejection power level indicated by the line 136. The first excitation profile 137, consisting of multiple bands, has a maximum level below the ejection power level 136 so that ions within the bands 137 are excited and detected while ions between and outside of the bands are not excited. In the excitation profile 140, the peaks of the bands are above the ejection power level so that all ions within the bands 140 are ejected while ions between and outside of the bands 140 remain in the cell and are available for further analysis. A third excitation profile is illustrated which has a base power level 141 below the excitation power level with several peak bands 142 which are above the ejection power level. This excitation profile provides a broad band excitation with selective ejection of ions lying within the bands 142; commonly, such an excitation profile would be utilized to eject the larger peaks in the mass spectrum of the material being tested with the ejection bands 142 being selected to cover such peaks so that the remaining ions excited by the power level 141 are more clearly visible from the spectrum. The combination of a broad band excitation level with one or more ejection power level peaks cannot readily be conducted using prior art frequency sweep excitation because of the difficulty of achieving rapid changes in excitation power levels during the frequency sweep.

Figure 20:
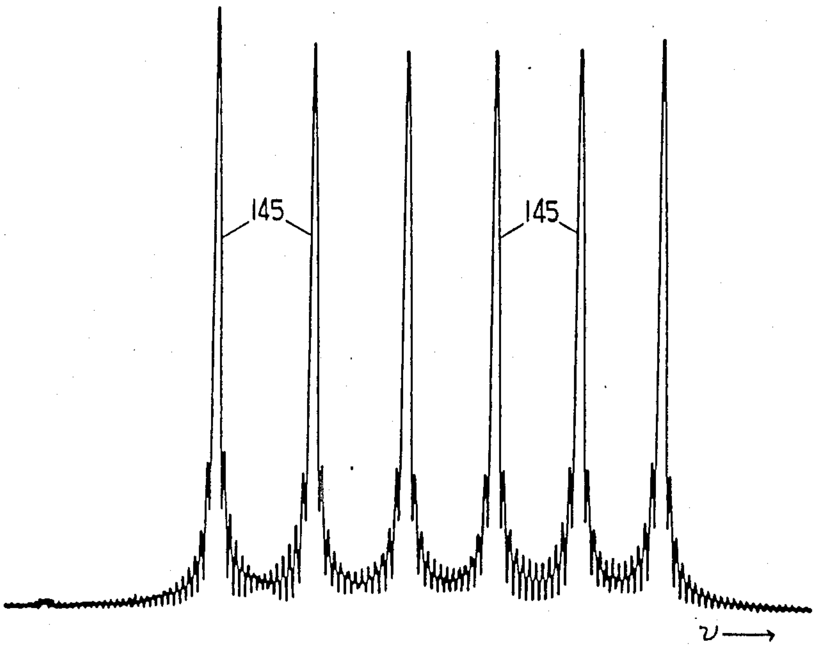
FIG. 20 is a graph of multiple ion excitation produced by frequency sweep excitation.
Figure 21:
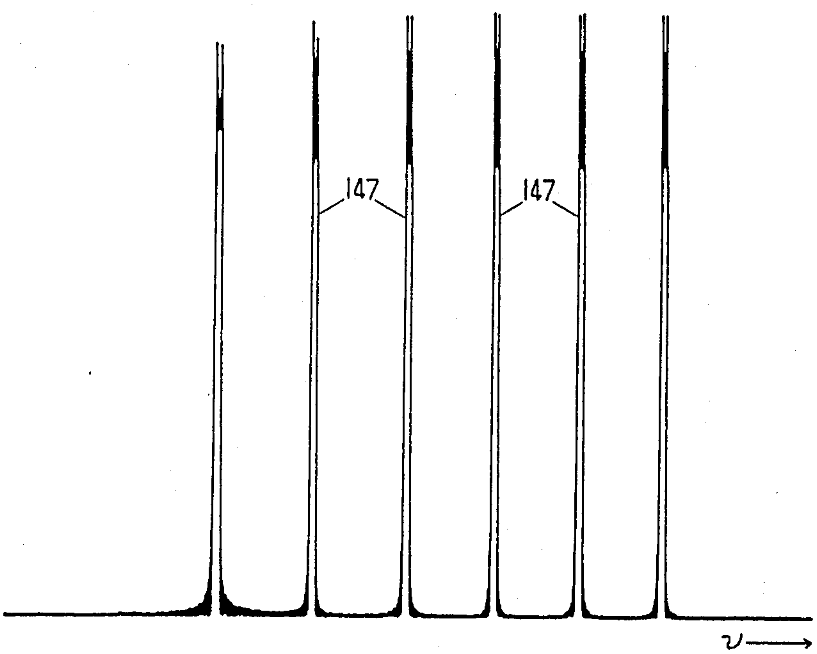
FIG. 21 is a graph of multiple ion excitation produced by tailored excitation.

A further advantage of the present method and apparatus over prior art techniques is illustrated in FIGS. 20 and 21. To excite ions selectively of six different mass-to-charge ratios, for example, without exciting ions of other mass-to-charge ratios using prior art instruments, it is necessary to turn the excitation on at or near one mass-to-charge ratio, then off, then on again at or near the second mass-to-charge ratio, and so on. If many different mass to charge ratios are to be excited in a given time period, then only a short time interval is available for excitation of any one mass-to-charge ratio, and the resultant excitation magnitude frequency spectrum is broad and shows auxiliary lobes extending far away from the desired mass-to-charge ratios, as illustrated by the graph 145 in FIG. 20. In contrast, because all mass-to-charge ratios are excited simultaneously utilizing the present invention with tailored excitation, the excitation power is concentrated much more selectively at the mass-to-charge ratios of interest, as shown by the graph 147 in FIG. 21 utilizing tailored excitation with phase variation in accordance with the present invention. For creation of the frequency domain spectrum 147 of FIG. 21 which has several very narrow bands, a phase function with numerous discontinuities, such as the pseudo-random phase function described above, may be used with satisfactory results.

One analytical limitation of present FTICR procedures is a relatively limited dynamic range in peak intensity in the FTICR spectra. Detection of small peaks in the presence of large peaks is limited by: a minimum detection limit of about 100 ions of a given mass to charge ratio; a maximum ion number in the cell limited to about 100,000 ions if the peak distortion from ion-ion Coulomb repulsions is to be avoided; the dynamic range of the analog-to-digital converter 56 (typically about 11 bits or a factor of about 2000); and the need to reduce the gain of the receiver amplifiers 52 and 53 (and thus reduce signal to noise ratio to some extent) where strong ICR signals are present.

In accordance with the present invention, the dynamic range can be significantly enhanced by acquiring an ICR spectrum with broadband excitation (e.g., frequency sweep) preferably optimized for detection of the strong peaks, creating a tailored excitation spectrum (e.g., as illustrated in FIG. 19 at 140) in which several narrow excitation bands are provided which lie at the frequencies of the large peaks; applying the tailored excitation to the ions in the cell in accordance with the invention to eject ions with a magnitude mode amplitude greater than a given threshold (e.g., 5% of the height of the largest peak in the original mass spectrum); then applying a broadband excitation to obtain an enhanced mass spectra of the remaining ions.

Figure 22:
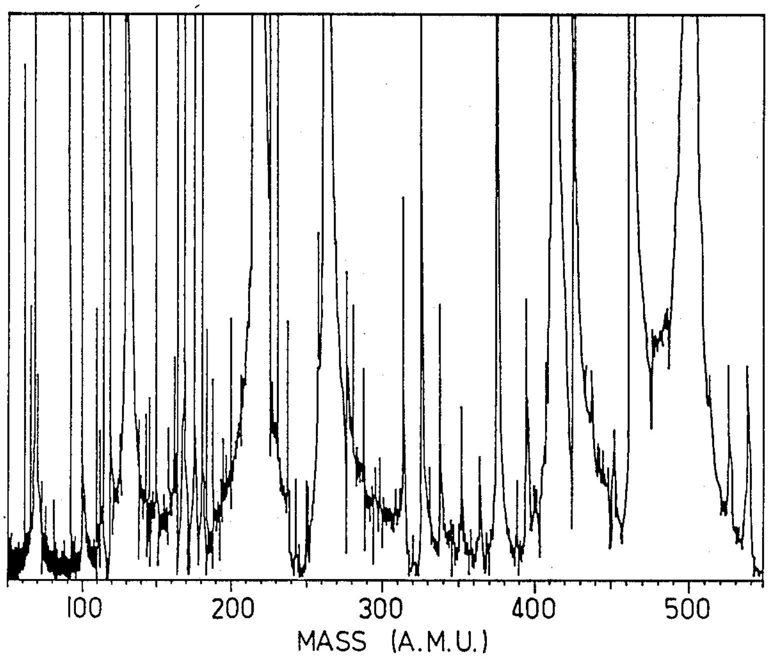
FIG. 22 is an FTICR mass spectra of perfluorotributylamine produced using broad band frequency sweep excitation.
Figure 23:
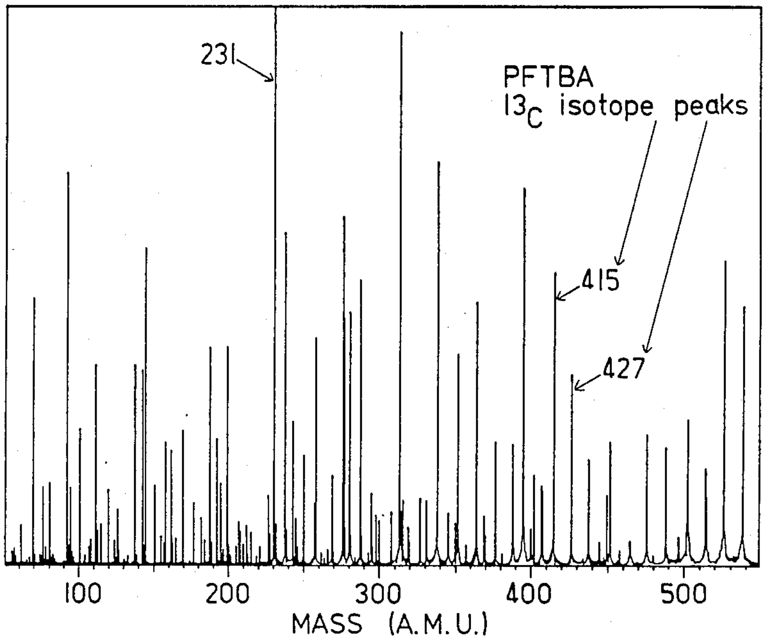
FIG. 23 is an FTICR mass spectra of perfluorotributylamine produced using tailored multiple ion ejection of the 23 most abundant ions.

The improvement in vertical dynamic range made possible by selective multiple-ion ejection of the most abundant ions may be illustrated with respect to an exemplary Fourier transform/ion cyclotron resonance (FT/ICR) mass spectrum of perfluorotributylamine (PFTBA), as shown in FIG. 22, with the vertical scale expanded so that the peak at mass-to-charge ratio 231 is full scale. Detection and quantitation of the intensities of the small peaks is clearly made more difficult by the line broadening produced by the abundant ions. However, when an excitation tailored to eject each of the 23 largest peaks in the mass spectrum is first applied, an excitation as exemplified by the ejection bands 140 shown in FIG. 19, followed by broad band excitation/detection, as illustrated by the excitation profile 131 in FIG. 18, the spectrum shown in FIG. 23 is obtained. Because the abundant ions have been removed, the remaining peaks are narrower, the base line is substantially flat, and it is possible to generate more ions initially to enhance the mass spectral signal-to-noise ratio. Thus, this multiple step tailored excitation substantially extends the dynamic range in FT/ICR mass spectrometry in the sense of allowing examination of large peaks in a sample at the full range for the large peaks followed by elimination of the large peaks and subsequent examination of the small peaks at the full scale of the instrument.

The computer program routines in the accompanying microfiche computer program listings illustrate the implementation of the foregoing procedures utilizing a Nicolet FTMS-1000 spectrometer control computer.

It is understood that the invention is not confined to the particular embodiments set forth herein as illustrative, but embraces such modified forms thereof as come within the scope of the following claims.

What is claimed is:

1. Ion mass spectrometry apparatus comprising:

(a) an ion cell including a plurality of electrode plates;

(b) means for detecting motion of ions in the cell and providing a signal indicative thereof;

(c) excitation means connected to the ion cell for producing an electric field in the cell which has a time domain waveform which is a selectively weighted and shifted inverse Fourier transform of components at discrete frequencies of a selected frequency domain excitation spectrum wherein the phases of the discrete frequency components are varied by the excitation means as a non-constant function of the frequencies of the components such that the frequency components are not all in phase at any point in time.

2. The apparatus of claim 1 in which the phases of the discrete frequency components are varied by the excitation means as a non-linear, continuous function.

3. The apparatus of claim 2 wherein the phases of the discrete frequency components are varied by the excitation means as a quadratic function.

4. The apparatus of claim 1 wherein the phases of the discrete frequency components are varied by the excitation means as a nonlinear function of frequency having at least one discontinuity.

5. The apparatus of claim 1 wherein the excitation means includes means for mixing a first higher frequency carrier signal with a time domain signal which is the inverse Fourier transform of the selected frequency domain excitation spectrum and wherein the excitation means produces an electric field in the cell which varies in accordance with the first higher frequency signal modulated by the time domain signal.

6. The apparatus of claim 5 including means for mixing the signal indicative of an ion motion with a second higher frequency carrier signal to produce a mixed signal having sum and difference frequency components and including means for filtering the mixed signal to isolate the difference frequency components indicative of an ion resonance response.

7. The apparatus of claim 1 wherein the excitation means includes:

(a) digital memory means for storing digital data in sequential locations which can be selectively read out, a magnitude of the digital data stored corresponding to the time domain waveform which is the selectively weighted and shifted inverse Fourier transform of the selected frequency domain excitation spectrum;

(b) digital-to-analog converter means connected to receive digital data input from the digital memory means and connected for providing its output analog signal to the ion cell;

(c) means for selectively controlling the output of the digital data stored in the digital memory means to the digital-to-analog converter means to control the application of the time domain waveform in the digital memory means in analog form to the ion cell.

8. The apparatus of claim 7 wherein the magnitude of the digital data stored in the digital memory means corresponds to a time domain waveform which is the inverse Fourier transform of the selected frequency domain excitation spectrum with, superimposed thereon, a magnitude envelope which varies as a function of time from zero magnitude at the beginning and end of the time domain waveform to a maximum magnitude level therebetween.

9. The apparatus of claim 1 wherein the means for detecting includes an amplifier means, having its input connected to a plate of the ion cell serving as a detector plate, for providing an output signal which is an amplified output of an electrical signal at the detector plate; and further including:

analog-to-digital converter means, connected to the output of the amplifier means, for converting the output signal thereof from an analog to a digital data signal;

means connected to receive the analog-to-digital converter means digital data output for providing output data indicative of the Fourier transform of the data signal from the analog-to-digital converter means.

10. The apparatus of claim 1 wherein the excitation means produces an electric field which has a time domain waveform which is the inverse Fourier transform of the selected frequency domain excitation spectrum with, superimposed thereon, a weighting function magnitude envelope which varies from a zero magntiude level at the beginning of the time domain waveform up to a maximum level decreases to a zero magnitude level at the end of the time domain waveform.

11. The apparatus of claim 3 wherein the derivative of the phase function with respect to the frequencies of the discrete frequency components does not exceed in absolute value π radius.

12. A method of providing ion excitation to an ion cell, comprising the steps of:

(a) creating a desired frequency domain spectrum which corresponds to selected mass-to-charge ratios of a range or ranges of ions to be detected and range or ranges of ions to be excluded from detection;

(b) selecting discrete frequency components of the frequency domain spectrum and applying to each such component a phase such that the phase of each of the selected components varies as a non-constant function of frequencies of the components such that the frequency components are not all in phase at any point in time;

(c) inverse Fourier transforming the selected frequency components to provide data indicative of a time domain waveform corresponding to a selectively weighted and shifted inverse Fourier transform;

(d) applying an electric field to the ion cell which has a time domain waveform which corresponds to the data indicative of the time domain waveform.

13. The method of claim 12 in which the phase of the frequency components varies as a non-linear, continuous function.

14. The method of claim 13 wherein the phase of the frequency components varies as a quadratic function.

15. The method of claim 12 in which the phase of the discrete frequency components varies as a nonlinear function of frequency having at least one discontinuity.

16. The method of claim 12 including, after the step of inverse Fourier transforming to provide data indicative of a time domain waveform, the additional step of applying a weighting function magnitude envelope to the data indicative of the time domain waveform which increases from a zero magnitude level at the beginning of the time domain waveform up to a maximum level a selected period of time later, remains at the maximum level over an intervening interval, and decreases to a zero magnitude level at the end of the time domain waveform.

17. The method of claim 12 including, after the step of inverse Fourier transforming the selected frequency components, the additional steps of converting the data indicative of the time domain waveform to an analog time domain signal and mixing a first higher frequency carrier signal with the analog time domain signal to provide a heterodyne signal, and wherein in the step of applying an electric field, the electric field applied has a time domain waveform which corresponds to the heterodyne signal comprising the mixed time domain signal and the first higher carrier frequency signal.

18. The method of claim 12 including the additional step of detecting cyclotron resonance motion of ions in the cell and providing a signal indicative thereof.

19. The method of claim 17 including the additional steps of detecting cyclotron resonance motion of ions in the cell and providing a signal indicative thereof, mixing the signal indicative of the ion cyclotron resonance motion with a second higher frequency carrier signal to produce a mixed signal having sum and difference frequency components, and isolating the difference frequency components indicative of the ion cyclotron resonance response.

20. The method of claim 12 wherein in the step of applying an electric field to the ion cell, the electric field has a time domain waveform which is the inverse Fourier transform of the selected frequency domain excitation spectrum with, superimposed thereon, a magnitude envelope which varies from a zero magnitude level at the beginning of the time domain waveform up to a maximum level and decreases to a zero magnitude level at the end of the time domain waveform.

21. The method of claim 14 wherein the derivative of the phase function with respect to the frequencies of the discrete frequency components does not exceed in absolute value π radians.

22. In an ion cyclotron resonance mass spectrometer of the type having an ion cyclotron resonance cell including excitation plates and detection plates, a magnet producing a substantially constant unidirectional magnetic field through the ion cyclotron resonance cell such that the electric field from potentials applied to the excitation plates is transverse to the applied magnetic field, means connected to the detector plates of the cell for detecting resonance motion of ions in the cell and providing a signal indicative thereof, and excitation amplifier means connected to the excitation plates for applying electrical potentials to the plates to form an electric field between the plates in accordance with an input signal to the excitation amplifier means, the improvement comprising:

(a) digital memory means containing digital data stored in sequential locations, a magnitude of the digital data stored corresponding to a time domain waveform which is a selectively weighted and shifted inverse Fourier transform of components at discrete frequencies of a selected frequency domain excitation spectrum, wherein the phases of the discrete frequency components are varied by the excitation means as a non-constant function of the frequencies of the components such that the frequency components are not all in phase at any point in time;

(b) digital-to-analog converter means connected to receive digital data input from the digital memory and connected for providing its output analog signal corresponding to the digital data to the excitation amplifier means; and (c) means for selectively controlling the output of the data stored in the digital memroy means to the digital-to-analog converter means to control the application of the time domain waveform in the digital memory means in analog form to the excitation amplifier means.

23. The apparatus of claim 22 in which the phases of the discrete frequency components are varied by the excitation means as a non-linear, continuous function.

24. The apparatus of claim 23 wherein the phases of the discrete frequency components are varied by the excitation means as a quadratic function.

25. The apparatus of claim 2 wherein the phases of the disccrete frequency components are varied by the excitation means as a nonlinear function of frequency having at least one discontinuity.

26. The apparatus of claim 22 including means for mixing a first higher frequency carrier signal with the time domain signal output from the digital-to-analog converter means and wherein the mixed signal is provided to the excitation amplifier means.

27. The apparatus of claim 26 including means for mixing the signal indicative of an ion resonance motion with a second carrier frequency signal to produce a mixed signal having sum and difference frequency components and including means for filtering the mixed signal to isolate the difference frequency components indicative of an ion resonance response.

28. The apparatus of claim 22 wherein the means for detecting includes an amplifier means, having an input connected to a detector plate of the ion cyclotron resonance cell, for providing an output signal which is an amplified output of the electrical signal at the detector plate, and further including:

analog-to-digital converter means, connected to the output of the amplifier means, for converting the output signal thereof from an analog to a digital data signal;

means connected to receive the analog-to-digital converters means digital data output for providing output data indicative of the Fourier transform of the digital data signal from the analog-to-digital converter means.

29. The apparatus of claim 22 wherein the memory means has stored therein a time domain waveform which is the inverse Fourier transform of the selected frequency domain excitation spectrum with, superimposed thereon, a magnitude envelope which varies from a zero magnitude level at the beginning of the time domain waveform up to a maximum level and decreases to a zero magnitude level at the end of the time domain waveform.

30. The apparatus of claim 22 wherein the derivative of the phase function with respect to the frequencies of the discrete frequency components does not exceed in absolute value $\pi$ radians.

31. In an ion trap cell of the type having a ring electrode and end plate electrodes, an ionizing source, and a means for detecting ions ejected from the cell to produce a signal indicative thereof, the improvement comprising:

excitation means connected to the end plates of the cell for producing an electric field in the cell which has a time domain waveform which is the selectively weighted and shifted inverse Fourier transform of components at disorete frequencies of a selected frequency domain excitation spectrum wherein the phases of the discrete frequency components are varied by the excitation means as a non-constant function of the frequencies of the components such that the frequency components are not all in phase in any point in time.

32. The apparatus of claim 31 wherein the phases of the discrete frequency components are varied by the excitation means as a non-linear, continuous function.

33. The apparatus of claim 32 wherein the phases of the discrete frequency components are varied by the excitation means as a quadratic function.

34. The apparatus of claim 33 wherein the phases of the discrete frequency components are varied by the exictation means as a nonlinear function of frequency having at least one discontinuity.

35. The apparatus of claim 31 wherein the excitation means includes means for mixing a first higher frequency carrier signal with a time domain signal which is the selectively weighted and shifted inverse Fourier transform of the selected frequency domain excitation spectrum and wherein the excitation means produces an electric field in the cell which varies in accordance with the first carrier frequency signal modulated by the time domain signal.

36. The apparatus of claim 35 including means for mixing the signal indicative of ions ejected from the cell with a second carrier frequency signal to produce a mixed signal having sum and difference frequency components and including means for filtering the mixed signals to isolate the difference frequency components indicative of an ion ejection response.

37. The apparatus of claim 31 wherein the excitation means includes:

(a) digital memory means for storing digital data in sequential locations which can be selectively read out, a magnitude of the digital data stored corresponding to the time domain waveform which is the selectively weighted and shifted inverse Fourier transform of the selected frequency domain excitation spectrum;

(b) digital-to-analog converter means connected to receive digital data input from the digital memory means and connected for providing its output analog signal corresponding to the digital data to the end plates of the ion trap cell;

(c) means for selectively controlling the output of the digital data stored in the digital memory means to the digital-to-analog converter means to control the application of the time domain waveform in the digital memory in analog form to the ion trap cell.

38. A method of ejecting selected mass-to-charge ratio ions from an ion trap cell of the type having a ring electrode and end plates, comprising the steps of:

(a) creating a desired frequency domain spectrum which corresponds to selected mass-to-charge ratios of a range or ranges of ions to be ejected and range or ranges of ions to be held within the cell;

(b) selecting discrete frequency components of the frequency domain spectrum and applying to each such component a phase such that the phase of each of the selected components varies as a non-constant function of frequencies of the components such that the frequency components are not all in phase at any point in time;

(c) inverse Fourier transforming the selected frequency components to provide data indicative of a time domain waveform corresponding to the selectively weighted and shifted inverse Fourier transform;

(d) applying a voltage to the end plates of the ion trap to create an electric field in the ion trap cell which has a time domain waveform which corresponds to the data indicative of the time domain waveform.

39. The method of claim 38 in which the phase of the frequency components varies as a non-linear, continuous function.

40. The method of claim 39 wherein the phase of the frequency components varies as a quadratic function.

41. The method of claim 38 wherein the phase of the discrete frequency components varies as a nonlinear function of frequency having at least one discontinuity.

42. A method of obtaining mass spectra from an ion cyclotron resonance mass spectrometer having enhanced dynamic range, comprising the steps of:

(a) applying broadband excitation to an ion cyclotron resonance cell to acquire an ion cyclotron resonance spectrum;

(b) creating a desired frequency domain spectrum having excitation bands at selected mass-to-charge ratios corresponding to selected large peaks in the previously acquired spectrum;

(c) selecting discrete frequency components of the frequency domain spectrum and applying to each such component a phase such that the phase of each of the selected components varies as a non-constant function of frequencies of the components such that the frequency components are not all in phase at any point in time;

(d) inverse Fourier transforming the selected frequency components to provide data indicative of a time domain waveform corresponding to the selectively weighted and shifted inverse Fourier transform;

(e) applying an electric field to the ion cell which has a time domain waveform which corresponds to the data indicative of the time domain waveform at a power level to eject ions in the excitation bands; and (f) applying a broadband excitation to the ion cell to acquire an ion cyclotron resonance spectrum containing the peaks corresponding to the ions remaining in the cell.

* * * * *